United States Patent [19]

Kennedy

[11] Patent Number: 4,483,514
[45] Date of Patent: Nov. 20, 1984

[54] GATE MEMBER FOR RESILIENT-SEATED GATE VALVE

[75] Inventor: Paul G. Kennedy, Horseheads, N.Y.

[73] Assignee: International Telephone and Telegraph Corporation, New York, N.Y.

[21] Appl. No.: 366,633

[22] Filed: Apr. 8, 1982

[51] Int. Cl.³ ............................................. F16K 3/314
[52] U.S. Cl. ..................................... 251/327; 251/328
[58] Field of Search ................ 251/326, 327, 328, 329

[56] References Cited

U.S. PATENT DOCUMENTS

| | | | |
|---|---|---|---|
| 3,662,778 | 5/1972 | Leopold, Jr. et al. ............... | 251/326 |
| 3,746,304 | 7/1973 | Matthias .............................. | 251/327 |
| 4,162,058 | 7/1979 | Ellis ..................................... | 251/326 |

FOREIGN PATENT DOCUMENTS

2221511 11/1972 Fed. Rep. of Germany ...... 251/327

Primary Examiner—Martin P. Schwadron
Assistant Examiner—James R. Shay
Attorney, Agent, or Firm—John T. O'Halloran; Peter R. Ruzek

[57] ABSTRACT

A gate member for a gate valve provides improved sealing by providing for proper orientation of the gate member as it approaches its closed position and then providing improved sealing action as the gate member is closed further. A lip on the gate member overlaps a ledge on the valve body at the opening where the gate member enters the valve chamber. The lip is covered by a seal of resilient material having a cross-sectional shape that cooperates with the valve body to orient the gate member and that controls the compression of the seal between the lip and ledge as the gate member closes further. The shape of the gate member also helps to orient it while it is closing. A spine and a ridged cap of resilient material on the leading edge of the gate member cooperate to prevent blow-by of pressurized fluid when the gate member is closed. Pads integral with the seal contact the corners of the opening initially to orient the gate member and then to fill the corners when the gate member is closed further.

32 Claims, 11 Drawing Figures

GATE MEMBER FOR RESILIENT-SEATED GATE VALVE

BACKGROUND OF THE INVENTION

1. Field of the Invention

This invention relates to a gate member for a resilient-seated gate valve, and more particularly, to a gate member with improved sealing to the valve body.

2. Description of the Prior Art

To improve sealing and reduce leakage through the valve when it is closed, gate valves have long used resilient material where the gate member mates with the valve body. Many patents show, and many manufacturers sell, gate valves with resilient material used in that way. See, for example, U.S. Pat. Nos. 2,420,849; 2,913,012; 2,942,841; 3,006,597; 3,151,838; 3,485,477; 3,633,873; 3,662,778; 3,738,383; 3,746,304; 4,162,058; and 4,223,868. In addition, the Clow Corporation markets a gate valve called the "R/W Valve" shown in the brochure "Resilient Wedge: A New Concept", A/S ESCO shows a gate valve in its flier "Sluseventil S-1100" and Daigle shows a gate valve in a brochure entitled "Vannes D-72—D'Avant-Garde", all of which have gate members that use resilient material on sealing surfaces.

Gate valves have various surfaces that must be completely sealed when the valve is closed. Gate valves have a valve body that forms a valve chamber having an opening. The gate member travels through the opening into and out of the valve chamber generally transverse to the direction of fluid flow through the valve. The opening into the valve chamber and the inside surfaces of the valve chamber contacted by the leading edge of the gate member must be sealed when the valve is closed.

SUMMARY OF THE INVENTION

One aspect of the present invention involves a gate member with improved sealing at the opening when the gate member is in the closed position. The gate member is usable with a gate valve including a valve body that forms a valve chamber having a flow path therethrough, an opening that provides access to the interior of the valve chamber for translation of the gate member into the valve chamber through the opening transverse to the flow path into a closed position, and a ledge on a part of the periphery of the opening outside the valve chamber. The gate member comprises a lip that overlaps the ledge when the gate member is in the closed position to form a sealing space between the lip and the ledge. The gate member further comprises a seal of resilient material on the lip for compression in the sealing space to substantially prevent flow therethrough when the gate member is closed. The seal has a bead portion and a clearance portion. The bead portion, when uncompressed, is thicker than the width of the space and contacts the ledge when the gate member reaches a nearly closed position. The clearance portion provides a gap between the seal and the ledge when the gate member is in the nearly closed position to control the seal as it is compressed by the closing gate member and reduce the amount of resilient material requiring compression to effectively seal the sealing space.

Another aspect of the invention is a gate member usable in a gate valve in which the valve body has two ledge portions opposing each other along the direction of the flow path with ledge surfaces diverging outwardly from the periphery of the opening at a first angle to the flow path. The lip includes surfaces that overlap the ledge surfaces to provide a sealing space having a uniform width at any given location to control the compression of the seal. The cross-section of the bead portion of the seal is arcuate and contacts the ledge surfaces proximate to the periphery of the opening. Cross-sectionally, the clearance portion is straight and tangent to the bead portion and extends from it at a second angle greater than the first angle. The seal urges the gate member into the middle of the opening in the direction of the flow path when the gate member is in the nearly closed position in which the bead portions contact the ledge surfaces.

In another aspect of the invention, the gate member is usable in a valve having a valve body that forms inside corners at the ends of the ledges, which face each other along the sides of the opening. The seal includes enlarged integral pads of resilient material at the ends of the seal to urge the gate member centrally of the opening when the gate member approaches the nearly closed position and fill the corners with resilient material when the gate member is closed.

Yet another aspect of the invention involves a gate member with improved sealing at the leading edge. The gate member is usable in a gate valve having a valve body forming a valve chamber with a flow path therethrough, an opening providing access to the interior of the valve chamber for translation of the gate member into the valve chamber transverse of the flow path into a closed position and a valve surface on the valve chamber at least partially circumscribing the flow path generally opposite the opening. The gate member comprises a leading edge that faces the valve surface when the gate member is closed. The gate member has a spine extending along at least a part of the leading edge and a cap of resilient material on that part of the leading edge for compression between the valve surface and the closed gate member to substantially prevent flow between the gate member and the valve surface. The cap includes a recess and two ridges flanking the recess. The recess is at substantially the same location along the flow path as the spine and provides a restriction to limit the deformation of the ridges by fluid pressure and resists fluid blow-by when the gate member is closed. In larger valves, the valve surface has a groove that accepts the cap to urge the leading edge of the gate member into the center of the valve surface and provide lateral stability to the cap when the gate member is closed.

The invention also comprises a gate member that has a configuration that cooperates with the valve body to urge the gate member into the middle of the opening or into the middle of the valve surface, or both, in a plane normal to the flow path. The gate member, in a plane normal to the flow path, includes a circularly arcuate middle portion and two straight portions extending outwardly at an angle from and tangent to the middle portion. The gate member is usable with a valve body that has a circularly arcuate middle portion and two straight portions extending outwardly from and tangent to the middle portion at the same angle as the gate member straight portions. The radii of curvature of the middle portions of the gate member and valve body are chosen so that the straight portions on the gate member contact the straight portions on the valve body before the middle portion of the gate member contacts the middle portion of the valve body. Either the seal or the cap or both on the gate member and, respectively, the ledge portions or valve surface or both of the valve body may have that configuration.

BRIEF DESCRIPTION OF THE DRAWINGS

FIG. 9 is a sectional view of the valve body taken along line 9—9 of FIG. 2. FIG. 9 is drawn to the same scale as FIG. 4.

FIG. 10 is a sectional view of the valve taken along line 10—10 of FIG. 2. FIG. 10 illustrates the groove in the valve surface.

DETAILED DESCRIPTION OF THE INVENTION

Figure 1:
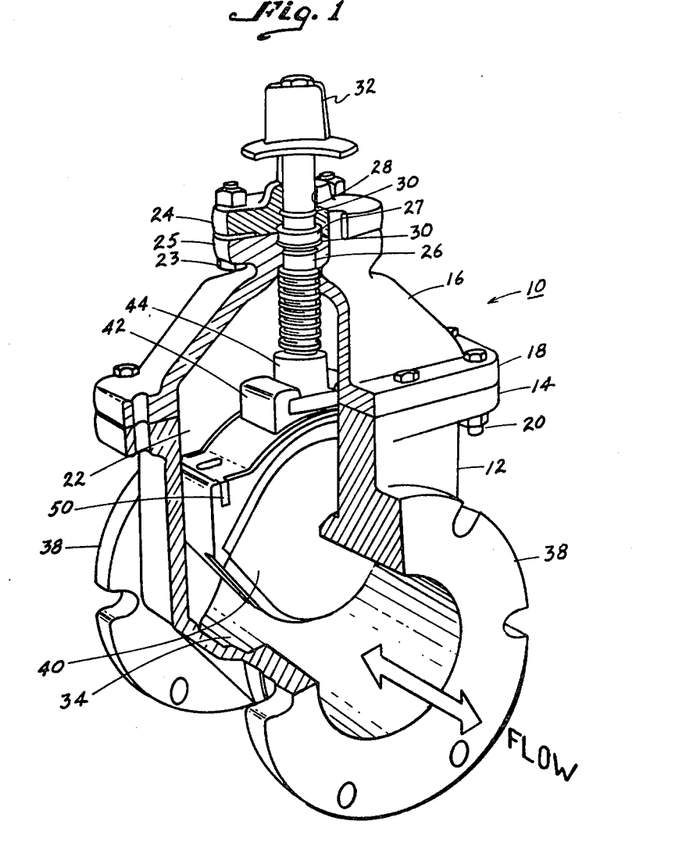
FIG. 1 is an isometric view of a gate valve having the gate member of the present invention. A portion of the valve body is cut away to illustrate better the relative position of the valve parts.
Figure 2:
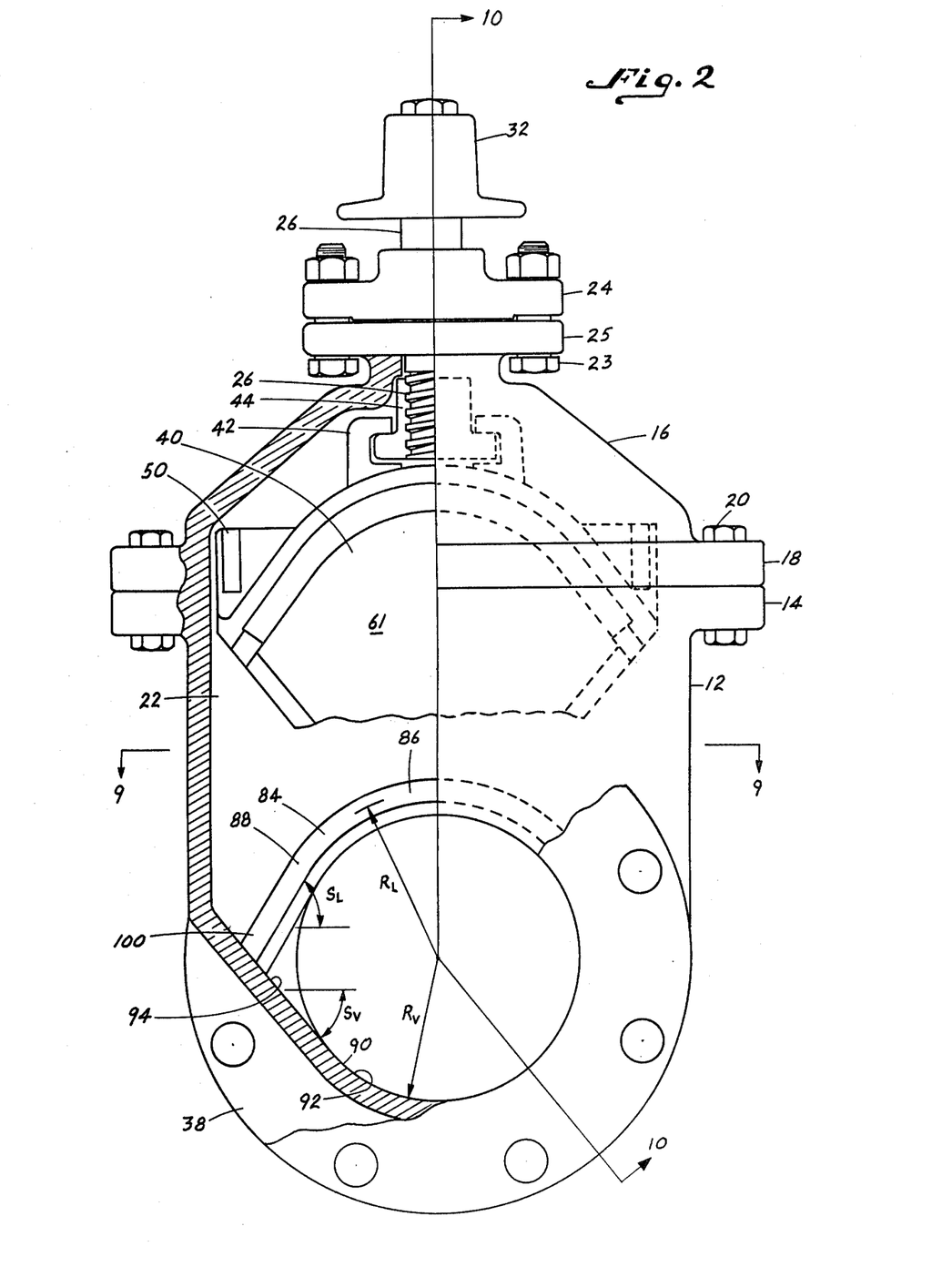
FIG. 2 is the valve shown in FIG. 1 in a partial sectional view taken in a plane normal to the direction of fluid flow bisecting the valve chamber.
Figure 10:
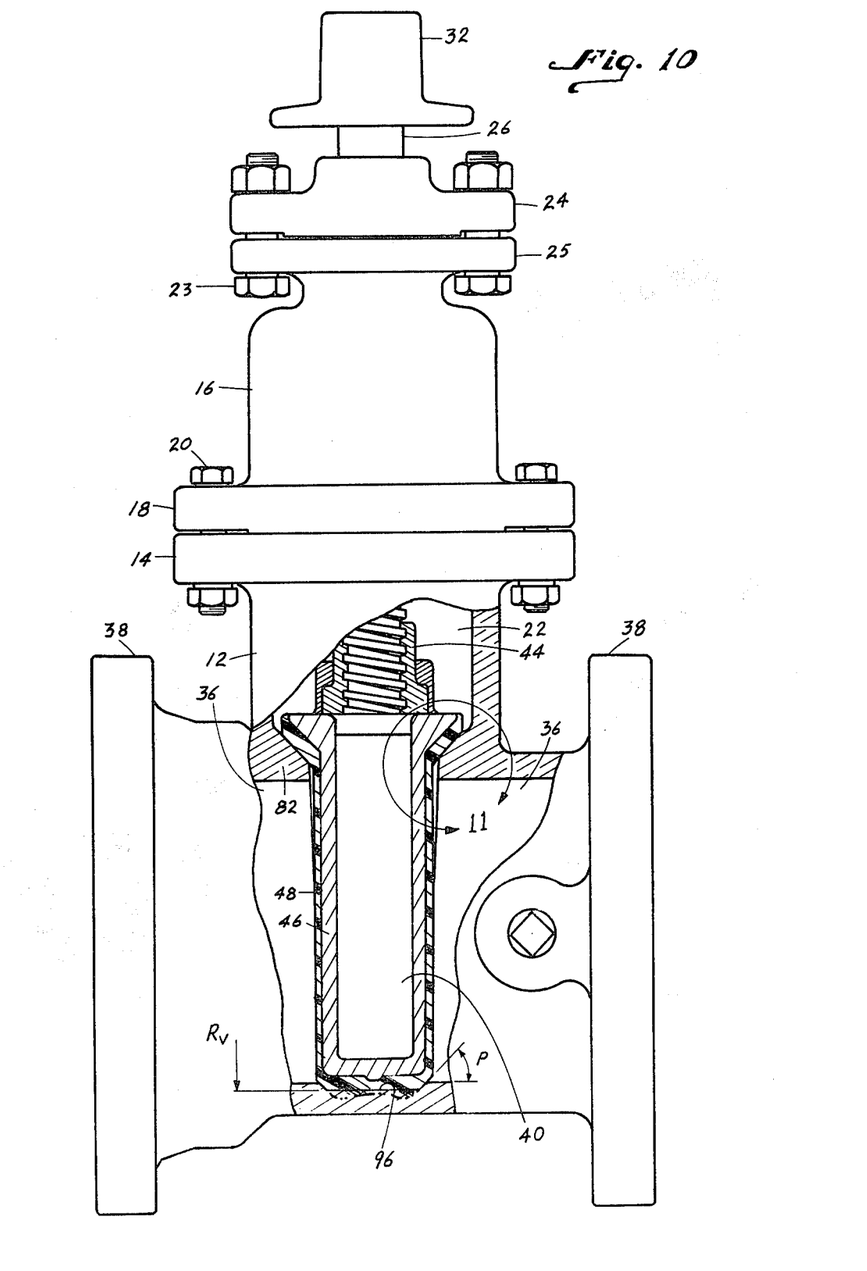

FIGS. 1, 2 and 10 show a gate valve 10 incorporating the present invention. The gate valve 10 comprises a valve body 12 that is a one-piece iron casting, although the valve body 12 may be made in any suitable manner or from any suitable material. The valve body 12 includes a flange 14. A valve bonnet 16 has a flange 18 that mates with the flange 14 on the valve body 12. Bolts 20 extend through the flanges 14 and 18 to hold the valve body 12 and the valve bonnet 16 together. The valve body 12 and the valve bonnet 16 together form a cavity 22. Bolts 23 hold a bearing plate 24 to a flange 25 at the top of the valve bonnet 16. A valve stem 26 extends through a bore 28 through the top of the valve bonnet 16 and the bearing plate 24. The bearing plate 24 and the flange 25 capture a thrust collar 27 on the valve stem 26 to secure the valve stem 26 against axial movement while permitting it to rotate about its own axis. Packing 30, comprising several O-rings, seals the valve stem 26 to the valve bonnet 16 and the bearing plate 24. An actuating nut 32 is secured to the end of the valve stem 26.

The valve body 12 forms a valve chamber 34 through which fluid can flow when the valve is open. Two substantially similar circular entrance portions 36 extend from the valve chamber 34 in the direction of the flow path. The entrance portions 36 terminate in flanges 38. The flanges 38 include slots or holes or both and comprise the means for including the gate valve 10 into a conduit to control fluid flow.

A gate member 40 translates into and out of the valve chamber 34, in a direction normal to the fluid flow through the valve chamber 34, to close and open the gate valve 10. The gate member 40 mounts to the end of the valve stem 26 inside the cavity 22. Ears 42 on the gate member 40 capture an internally threaded stem nut 44. The valve stem 26 threads into the stem nut 44, which is held by the ears 42 against rotation about the axis of the valve stem 26. The walls of the valve body 12 guide the gate member 40, permitting it to translate along, but not rotate about, the axis of the valve stem 26. Turning the actuation nut 32 thus raises and lowers the gate member 40.

FIGS. 3–8 illustrate in detail the gate member 40 incorporating the present invention. The gate member 40 has an inner, rigid, mostly hollow member 46 which, in this embodiment, is a one-piece iron casting. An outer, resilient member 48 is bonded to and almost completely encapsulates the inner casting 46. The outer resilient member 48 is, in this embodiment, a synthetic elastomer such as Buna-N with a hardness of 55–65 on the Durometer scale. The outer resilient member 48 is bonded by vulcanization to the inner casting 46 and encapsulates the entire inner casting 46 except for the top of the inner casting 46, the ears 42 and four guide bearing surfaces 50.

Figures 3, 5, 6, 7, 11:
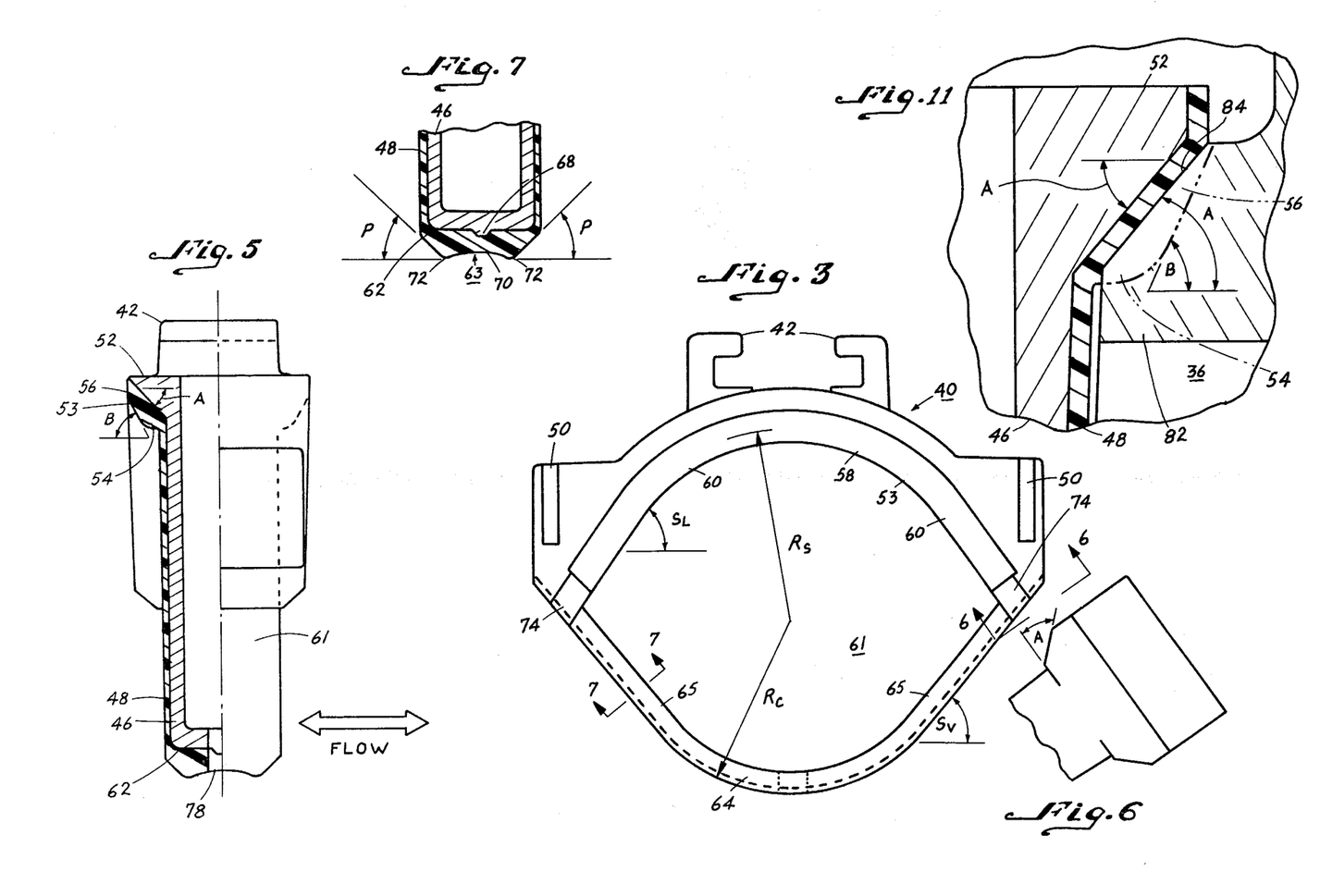
FIG. 3 is a front view of the gate member of the valve shown in FIG. 1.
FIG. 5 shows the gate member of FIG. 3 in a partial sectional view taken along the line 5—5 in FIG. 4.
FIG. 6 shows the gate member of FIG. 3 as viewed from line 6—6.
FIG. 7 shows the gate member of FIG. 3 in a partial sectional view taken along line 7—7 in FIG. 3.
FIG. 11 is a detail view of the portion of the valve indicated by line 11 in FIG. 10.

The inner casting 46 includes a lip 52. The outer resilient member 48 has a seal 53 on the lip 52. The seal 53 comprises a bead portion 54 and a clearance portion 56 that diverges from the bead portion 54. The surface of the lip 52 forms an angle A relative to the flow direction through the valve chamber 34 along the entire length of the lip 52. The bead portion 54 is circularly arcuate in cross-section. The clearance portion 56 is straight in cross-section and diverges from the bead portion 54, tangent thereto, at an angle B relative to the direction of fluid flow. FIG. 5 best illustrates the lip 52 and the bead portion 54 and clearance portion 56 that comprise the seal 53. The gate member 40 is symmetrical about a plane normal to the flow path and passing through the valve stem 26. Both sides of the gate member 40 have a lip 52 and a seal 53. (See FIGS. 4, 5 and 10.)

As shown in FIG. 3, the lip 52 and the seal 53 have a central, circularly arcuate middle seal portion 58 and two straight seal portions 60 that extend outwardly from and tangent to the arcuate portion 58. The gate member 40 is symmetrical in a plane normal to the flow path, as seen in FIG. 3. The straight seal portions 60 form an angle $S_L$ with a plane normal to the valve stem 26.

The gate member 40 comprises a generally flat disc 61 bounded by a bottom, or leading, edge 62. FIG. 7 shows the configuration of a cap 63 formed by the outer resilient member 48 on the leading edge 62 of the gate member 40. The cap 63 has a central, circularly arcuate middle cap portion 64 and two straight cap portions 65 that extend outwardly from and tangent to the arcuate middle cap portion 64. The straight cap portions 65 form an angle $S_V$ with a plane normal to the valve stem 26. The leading edge 62 includes an integral spine 68 that extends along the leading edge 62 of the gate member 40. The cap 63 has a recess 70 that extends along the leading edge 62 of the gate member 40 and two ridges 72 flanking the recess 70. The sides of the ridges 72 are flat and form an angle P with the direction of fluid flow through the valve chamber 34. The cap 63 has substantially the same cross-sectional dimensions for its entire length.

Figure 8:
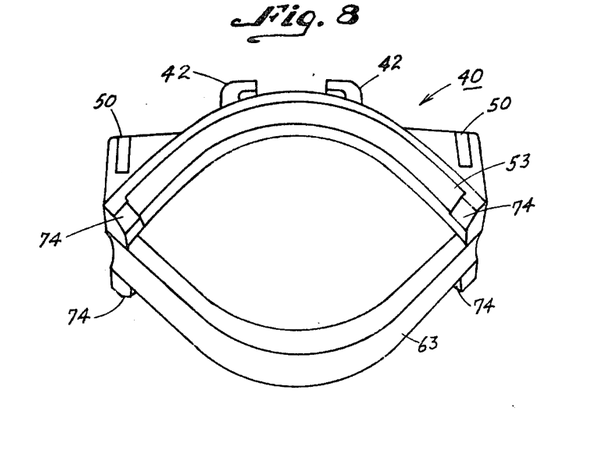
FIG. 8 is an isometric view of the gate member shown in FIG. 3.

As shown in FIGS. 3 and 8, the seal 53 on the gate member 40 includes enlarged pads 74 at both ends of the straight seal portions 60 where they meet at the straight cap portions 65. The enlarged pads 74 form an angle A with the flow path, as shown in FIG. 6. Except for the enlarged pads 74, the seals 53 have substantially the same cross-sectional dimensions for their entire length.

In the embodiment shown, the angle A, formed by the pads 74 and the lip 52 with the direction of flow through the valve chamber 34, is 45°. The angle B, formed by the clearance portion 56 of the seal 53 on the gate member 40 with the direction of fluid flow, is 60°. The angle P, formed by the sides of the ridges 72 with the direction of fluid flow, is 45°. The angle $S_L$ is measured between the straight seal portions 60 and a plane normal to the valve stem 26. The magnitude of $S_L$ depends on the valve size and is discussed below. The angle $S_V$, between the straight cap portions 65 and a plane normal to the valve stem 26, is 50°.

Figure 4:
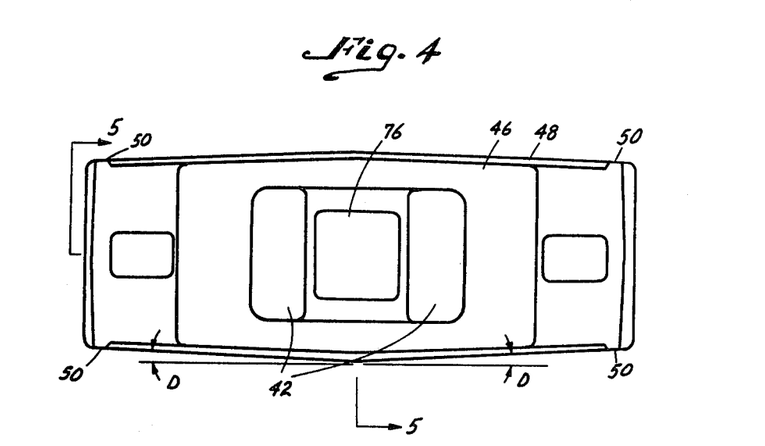
FIG. 4 is a top view of the gate member shown in FIG. 3.

FIGS. 4 and 5 illustrate other features of the gate member 40. FIG. 4 shows a central hole 76 in the top of the inner casting 46. The end of the valve stem 26 enters the hollow inner casting 46 through the hole 76 when the gate member 40 is raised. The gate valve 10 is a "nonrising-stem" type gate valve in which the valve stem 26 is restrained axially as it is turned. Gate valves may also be of the "rising-stem" type in which the valve stem threads through the top of the valve bonnet. Thus, as the valve stem is turned in a rising-stem type valve, the valve stem travels outwardly with the gate member as the valve is opened. As those skilled in the art will appreciate, the present invention can be used with either type of gate valve. The bottom of the gate member 40 includes a hole 78 (see FIG. 5.) The hole 78 permits the gate member 40 to drain after pre-installation testing. Both sides of the upper portion of the gate member 40, which includes the lip 52 and the seal 53, and both sides of the disc 61 taper from the center to the edges at a small angle D. (See FIG. 4.)

FIGS. 2 and 9-11 best show the valve body 12. The valve body 12 defines an opening 78 that provides access to the valve chamber 34 from the cavity 22. The disc 61 of the gate member 40 translates through the opening 78 into and out of the valve chamber 34. The periphery of the opening 78 includes a ledge that comprises two ledge portions 82 that face each other across the opening 78. Each ledge portion 82 includes a ledge surface 84 that diverges outwardly from the periphery of the opening 78 at an angle A to the direction of flow through the valve chamber 34. As noted before, the angle A in this embodiment is 45°.

As shown in FIG. 2, each ledge portions 82 include a circularly arcuate middle ledge portion 86 that is an extension of the entrance portions 36 to the valve chamber 34. The ledge portions 82 also include straight ledge portions 88 that extend outwardly from the middle ledge portion 86, tangent thereto, at the ledge angle $S_L$. The valve chamber 34 includes a valve surface 90 that faces the leading edge 62 of the gate member 40 and is opposite the opening 78. The valve surface 90 includes a circularly arcuate middle valve surface portion 92 that is an extension of the entrance portions 36 to the valve chamber 34. The valve surface 90 also includes two straight valve surface portions 94 that extend outwardly from the middle valve surface portion 92, tangent thereto, at the valve angle $S_V$, here 50°.

As illustrated in FIG. 10 (not omitted from FIG. 2), larger valve sizes, for example those with entrance portions 36 having a 10″ or greater diameter, advantageously include a groove 96 in the valve surface 90. The groove 96 extends along the valve surface 90. The groove 96 has a flat bottom and sides that diverge outwardly therefrom at the ridge angle P, here 45°, to the flow path. For a valve body having the groove 96, the angle $S_L$ is made somewhat larger. In the embodiment shown, $S_L$ is 55° for valves in which the entrance portions 36 are up to 10″ in diameter. For sizes 10″ in diameter and over, which include the groove 96 in the valve surface, $S_L$ is 60°.

Figure 9:
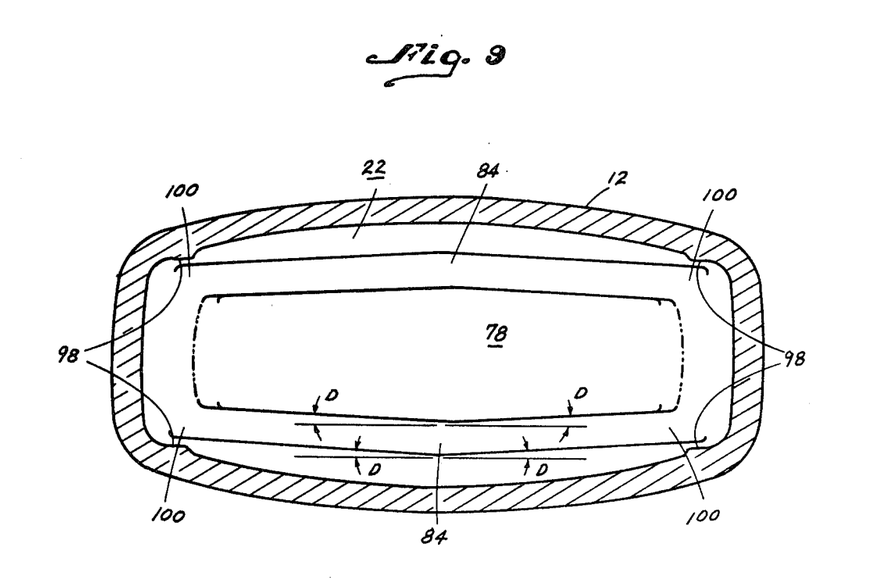

As shown in FIG. 9, the opening 78, and the ledge surfaces 84, converge slightly from the center to the ends at a small angle D. The angle D, on the gate member 40 and the opening 78, is typically about 2°.

The present invention provides vastly improved sealing between the gate member 40 and the opening 78 and between the gate member 40 and the valving surface 90 when the valve is closed. A description of the operation of valve 10 will better demonstrate how the present invention works.

As shown in FIG. 1, and briefly described above, the flat disc 61 of the gate member 40 translates into and out of the opening 78 to close and open the valve. The guide bearing surfaces 50 slide on guide surfaces 98 in the valve body 12 (FIG. 9) to provide smooth translation of the gate member 40 as the valve stem 26 is turned by the actuation nut 32. FIGS. 4 and 9, which are drawn to the same scale, illustrate how the gate member 40 fits into the cavity 22 and the opening 78 and how the guide bearing surfaces 50 allow the gate member 40 to travel smoothly within the cavity 22. The resilient material 48 does not cover the guide bearing surfaces 50 to facilitate the sliding action of the gate member 40 within the cavity 22.

The radius of curvature $R_S$ of the middle seal portions 58 is slightly smaller than the radius of curvature $R_L$ of the middle ledge portions 86 (see FIG. 2). The radius of curvature $R_C$ of the middle cap portion 64 on the leading edge of the gate member 40 is slightly larger than the radius of curvature $R_V$ of the middle valve surface portion 92. In valves having the groove 96 in the valve surface 90, $R_V$ and $S_V$ are measured to the bottom of the groove 96. (See FIG. 10.) The angles $S_L$ and $S_V$ of the straight portions on the gate member 40, and on the ledge 82 and the valving surface 90, are the same. The straight portions 60 and 65 of the gate member 40 meet the straight portions 88 and 94 of the ledge 82 and the valve surface 90 when the gate member 40 reaches a nearly closed position. Then, as the gate member 40 continues to its fully closed position, the respective curved portions of the gate member and the valve body meet. This arrangement increases the effectiveness of the seal between the gate member 40 and the valve body 12 because it ensures that the resilient material 48 on the gate member 40 is stressed in almost pure compression rather than being subjected to shear forces, which reduce sealing effectiveness. It also serves to center the gate member 40 in the valve chamber 34 in a plane normal to the direction of fluid flow (see FIG. 2), because the straight sides on the gate member and valve body "guide" the gate member 40 before the seals 53 are compressed between the lip 52 and ledges 82 and the cap 63 is compressed between the leading edge 62 and the valve surface 90.

As pointed out above, larger valve sizes have the groove 96 in the valve surface 90. For purposes of illustration, the valve shown in FIG. 2 does not include the groove 96, while FIG. 10 shows the location of the groove 96 and how $R_V$ is measured in a valve having the groove 96. The angle $S_L$ in a valve having the groove 96 is made larger, here 60°, in valves having entrance portions 36 with a 10" or larger diameter. The angle $S_L$ is increased because a valve having the groove 96 has a longer valve surface 90 than the same valve without a groove. Ideally, the force per unit length should be the same on the seal 53 and the cap 63 when the gate member 40 is closed. A valve without the groove 96 will have a particular force balance between the seal 53 and the cap 63 (preferably as nearly ideal as possible), but increasing the length of the surface against which the cap 63 is compressed upsets that force balance. Increasing the angle $S_L$ decreases the length of the valve surface and thus establishes a more nearly ideal force balance.

The sealing action between the lips 46 and the ledge surfaces 84 is illustrated in detail in FIG. 11. The bead portion 54 contacts the ledge surface 84 near the periphery of the opening 78 when the gate member 40 reaches the nearly closed position. The lip 52 overlaps the ledge 82 a predetermined distance L to provide a sealing space between the lip and the ledge. In this embodiment of the invention, the diverging surface 84 of the ledge 82 and the surface of the lip 46 provide a sealing space having a uniform width at any given location because they both form the same angle A with the flow path, in this embodiment 45°. The clearance portion 56, which diverges from the bead portion 54 at an angle B, here 60°, greater than the angle A, provides a gap between the seal 53 and the ledge 82 when the gate member 40 is in the nearly closed position to control accurately the seal as it is compressed by the closing gate member, ensuring that the seal fills the sealing space, and to reduce the amount of resilient material requiring compression to fill the sealing space. The overlap L of the lip 52 and ledge 82 provides two surfaces between which the seal 53 is compressed to close the sealing space, rather than subjecting the seal 53 to a large shear force component. The diverging ledge surfaces 84 facing each other on opposite sides of the opening 78 cooperate with the bead portions 54 of the seal 53 to urge the gate member 40 into the middle of the opening in a direction parallel to the flow path (see FIG. 9 or 10) when the gate member reaches the nearly closed position.

The straight ledge portions 88 form corners 100 at their ends where they meet the straight valve surface portions 94 (see FIGS. 2 and 9). The corners 100 present a particularly difficult problem in sealing the opening 78 with the gate member 40. The enlarged pads 74 at the ends of the straight seal portions 60 on the gate member 40 effectively seal the opening 78 at the corners 100. The enlarged pads 74 urge the gate member 40 centrally of the opening 78 when the gate member approaches the nearly closed position because the pads 74 contact the ledge (see FIG. 9). The pads 74 also provide a comparatively large volume of resilient material that fills the corners 100 as the gate member 40 is forced into the closed position against the ledge 82. The small angles D help maintain the central position of the gate member 40 within the opening 78.

At the leading edge 62 of the gate member 40, the spine 68, the recess 70 and the ridge 72 provide a seal between the leading edge 62 and the valve surface 90 that resists "blow-by" of pressurized fluid when the valve is closed. In some prior art valves, such as that shown in U.S. Pat. No. 3,746,304 to Matthias, the gate member is covered by a cap of resilient material having a central recess and two ridges (see FIG. 4a of the Matthias patent). Such an arrangement somewhat restricts the passage of highly pressurized fluid between the gate member and the valve surface. In the present invention, as best shown in FIG. 7, the spine 68, when the leading edge of the gate member 40 is compressed against the valve surface 90, provides a restriction through which the now compressed ridges 72 would have to pass to permit blow-by of the pressurized fluid.

For particularly large valve sizes the cap 63 of resilient material at the leading edge 62 of the gate member 40 will be large enough to render the spine 68 less effective in preventing blow-by. The larger amount of resilient material in the cap will more easily be deformed through the restriction provided by the spine 68. The groove 96 in the valve surface 90 helps prevent blow-by in larger valve sizes. It also helps to center the leading edge of the disc 61 as the gate member closes, which can be a problem in larger valves because the increased disc areas results in much larger fluid forces on the gate member, tending to "cock" it as it closes. As the gate member 40 reaches the nearly closed position, the cap 63 of resilient material enters the groove 96. The angled sides of the groove 96 and the ridges 72 guide the gate member 40 into position. The groove 96 also provides lateral stability to the larger cap when the valve is closed, thus further resisting blow-by.

The gate member 40 forms a very effective seal with the valve body 12 because of the present invention. As the gate member 40 closes, the enlarged pads 74 contact the ledge surfaces 84 at the corners 100 and properly orient the gate member 40 relative to the opening in a plane normal to the valve stem as the gate member passes through this position. As the gate member closes further, the straight portions of the seal and cap on the gate member contact the straight portions of the ledge and valve surface on the valve body, orienting the gate member in the center of the opening in a plane normal to the direction of fluid flow. The diverging ledge surfaces 84 and the seals 53 on the gate member orient the gate member in the center of the opening in the direction of fluid flow. In larger valve sizes, the leading edge of the disc portion 61 of the gate member may still not be properly oriented at this juncture. The sloped sides of the groove 96 in the valve surface act on the sloped sides of the ridges 72 properly to orient the leading edge in those larger sizes. With the gate member thus properly oriented in this nearly closed position, the further closing gate member provides a sealing space between the overlapping lip 52 and ledge 82 for compressing the seal 53. The leading edge of the gate member and the valving surface compress the cap 63. The configuration of the seal 53 ensures that its compression is controlled within the sealing space and that excessive force is not required to compress it fully to fill the sealing space. The configuration of the cap 63 and the spine 68 prevent blow-by of fluid.

Thus, the various aspects of the present invention provide a greatly improved seal between the gate member of a gate valve and the valve body. The present invention has been described in connection with a gate valve having a particular construction and configuration. Various modifications to that structure and configuration were discussed. However, those skilled in the art will recognize that other modifications may be made without departing from the scope of the present invention, which is defined solely by the following claims.

We claim:

1. A gate member for a gate valve including a valve body forming a valve chamber having a flow path therethrough, an opening providing access to the interior of the valve chamber for translation of said gate member into the valve chamber transverse to the flow path into a closed position and a ledge on at least a part of the periphery of the opening outside the valve chamber, said gate member comprising:

a lip for overlapping the ledge when said gate member is in the closed position to form a sealing space between said lip and said ledge; and a seal of resilient material on said lip for compression in said sealing space to substantially prevent flow therethrough when said gate member is closed, said seal having, at a region thereof that is closer to the flow path, a bead portion thicker when uncompressed than the width of said sealing space for contacting the ledge when said gate member reaches a nearly closed position and, at a region thereof that is more remote from the flow path, a clearance portion for providing a gap between said seal and the ledge when said gate member is in said nearly closed position so to control said seal as it is compressed by the further closing gate member that the material displaced from said bead portion yields into said gap, ensuring that said seal fills said sealing space, and to reduce the amount of resilient material requiring compression to effectively seal said sealing space.

2. The gate member recited in claim 1 for a gate valve in which the ledge includes two ledge portions extending the length of the opening along the sides thereof opposing each other along the direction of the flow path with ledge surfaces diverging outwardly from the periphery of the opening, wherein:

said lip includes two lip surfaces at a first angle to the flow path for overlapping the ledge surfaces to form said sealing space with a uniform width at any given location for accurate control of the compression of said seal;

both said lip surfaces have said seal thereon; and said bead portion is arcuate in cross-section for contacting the ledge surfaces proximate to the periphery of the opening and said clearance portion is straight in cross-section and tangent to said bead portion extending therefrom at a second angle to the flow path greater than the first angle for urging said gate member into the middle of the opening in the direction of the flow path in said nearly closed position.

3. The gate recited in claim 2 wherein said seal has a uniform cross-section along the length thereof and said seal on each said lip surface is symmetrical in a plane normal to the flow path and includes a substantially circularly arcuate middle seal portion and straight seal portions extending outwardly from said middle seal portions and tangent thereto at a ledge angle for urging said gate member into the middle of the opening in a plane normal to the flow path in said nearly closed position and providing substantially uniform compression of said seal for the length thereof in a gate valve further including a valve chamber with substantially circularly cylindrical entrance portions with the opening between the entrance portions along the direction of the flow path and a ledge symmetrical in a plane normal to the flow path with middle ledge portions comprising extensions of the entrance portions and having a radius of curvature larger than the radius of curvature of said middle seal portions and with straight ledge portions extending outwardly from said middle ledge portions tangent thereto at said ledge angle.

4. The gate member recited in claim 2 or 3 wherein said first angle is 45°, said second angle is 60° and said bead portion is a circularly arcuate segment in cross-section.

5. The gate member recited in claim 3 for a gate valve further including an opening having inside corners at the ends of the straight ledge portions, wherein said seal further comprises an integral pad of said resilient material having an enlarged cross-section at the end of each said straight seal portion for urging said gate member centrally of the opening as said gate member approaches said nearly closed position and for filling the corners with resilient material when said gate member is closed.

6. The gate member recited in claim 5 wherein said enlarged pads have flat surfaces disposed at said first angle to said flow path.

7. The gate member recited in claim 6 wherein said first angle is 45°, said second angle is 60° and said bead portion is a circularly arcuate segment in cross-section.

8. A gate member for a gate valve including a valve body forming a valve chamber having a flow path therethrough, an opening providing access to the interior of the valve chamber for translation of said gate member into the valve chamber transverse of the flow path into a closed position and a valve surface on the valve chamber at least partially circumscribing the flow path generally opposite the opening, said gate member comprising:

a leading edge for facing the valve surface when said gate member is closed;

a raised spine extending along at least a part of said leading edge; and a cap of resilient material on said part of said leading edge for compression between the valve surface and said leading edge when said gate member is closed to substantially prevent flow therebetween, said cap in cross-section having a recess and two ridges flanking said recess, said recess being at substantially the same location as said spine in the direction of the flow path for said spine to provide a restriction to limit the deformation of said ridges by fluid pressure and resist fluid blow-by when said gate member is closed.

9. The gate member recited in claim 8 wherein said raised spine extends the length of said leading edge and said cap has a uniform cross-section along the length thereof and is symmetrical in a plane normal to the flow path and includes a substantially circularly arcuate middle cap portion and straight cap portions extending outwardly from said middle cap portion tangent thereto at a valve angle for urging said leading edge of said gate member into the middle of the valve surface in a plane normal to the flow path when said gate member is in a nearly closed position and providing substantially uniform compression of said cap for the length thereof in a gate valve further including a valve chamber with substantially circularly cylindrical entrance portions having a radius of curvature smaller than the radius of curvature of said middle cap portion with the valve surface between the entrance portions in the direction of the flow path and opposite the opening, the valve surface being symmetrical in a plane normal to the flow path and including a middle valve surface portion comprising an extension of the entrance portions and straight valve surface portions extending outwardly from the middle valve surface portion tangent thereto at said valve angle.

10. The gate member recited in claim 9 wherein said valve angle is 50° to a plane normal to the direction of travel of said gate member.

11. A gate member for a gate valve including a valve body forming a valve chamber having a flow path therethrough, an opening providing access to the interior of the valve chamber for translation of said gate member into the valve chamber transverse of the flow path into a closed position and a valve surface on the valve chamber at least partially circumscribing the flow path generally opposite the opening, said gate member comprising:
  a leading edge for facing the valve surface when said gate member is closed;
  a raised spine extending along at least a part of said leading edge; and
  a cap of resilient material on said part of said leading edge for compression between the valve surface and said leading edge when said gate member is closed to substantially prevent flow therebetween, said cap in cross-section having a recess and two ridges flanking said recess, said recess being at substantially the same location as said spine in the direction of the flow path for said spine to provide a restriction to limit the deformation of said ridges by fluid pressure and resist fluid blow-by when said gate member is closed, said ridges have straight sides diverging outwardly at a ridge angle for urging said leading edge of said gate member into the center of the valve surface when said gate member is in said nearly closed position in a gate valve further including a groove in the valve surface having straight sides diverging outwardly from the bottom surface of the groove at said ridge angle to the flow path.

12. The gate member recited in claim 11 wherein said ridge angle is 45°.

13. The gate member recited in claim 11 wherein said raised spine extends the length of said leading edge and said cap has a uniform cross-section along the length thereof and is symmetrical in a plane normal to the flow path and includes a substantially circularly arcuate middle cap portion and straight cap portions extending outwardly from said middle cap portion tangent thereto at a valve angle for urging said leading edge of said gate member into the middle of the valve surface in a plane normal to the flow path when said gate member is in a nearly closed position and providing substantially uniform compression of said cap for the length thereof in a gate valve further including a valve chamber with substantially circularly cylindrical entrance portions having a radius of curvature smaller than the radius of curvature of said middle cap portion with the valve surface between the entrance portions in the direction of the flow path and opposite the opening, the valve surface being symmetrical in a plane normal to the flow path and including a middle valve surface portion comprising an extension of the entrance portions and straight valve surface portions extending outwardly from the middle valve surface portion tangent thereto at said valve angle.

14. The gate member recited in claim 13, wherein said valve angle is 50° to a plane normal to the direction of travel of said gate member.

15. The gate member recited in claim 8, 9 or 10 for a gate valve including a valve body forming a ledge with two ledge portions opposing each other along the direction of the flow path on the periphery of the opening outside the valve chamber and having ledge surfaces diverging outwardly from the periphery of the opening and terminating at a valve surface extending from one end of the opening to the other, said gate member further comprising:
  two lip surfaces at a first angle to the flow path for overlapping the ledge surfaces when said gate member is closed to form between each said lip surface and ledge surface a sealing space with a uniform width at any given location; and
  a seal of resilient material on each said lip surface for compression in said sealing space to substantially prevent flow through the opening when said gate member is closed, each said seal having a bead portion arcuate in cross-section and thicker when uncompressed than the width of said sealing space for contacting the ledge surface proximate to the periphery of the opening when said gate member reaches a nearly closed position and urging said gate member into the middle of the opening in the direction of the flow path and a straight clearance portion tangent to said bead portion and extending therefrom away from the opening at a second angle to the flow path greater than the first angle for providing a gap between said seal and the ledge surface when said gate member is in said nearly closed position so to control said seal as it is compressed by the further closing gate member that the material displaced from the bead portion yields into said gap, ensuring that said seal fills said sealing space, and to reduce the amount of resilient material requiring compression to effectively seal said sealing space.

16. The gate member recited in claim 15 for a gate valve further including an opening having inside corners at the ends of the ledge portions, wherein said seal further comprises an integral pad of said resilient material having an enlarged cross-section at the end of each said seal for urging said gate member centrally of said opening as said gate member approaches said nearly closed position and for filling the corners with resilient material when said gate member is closed.

17. The gate member recited in claim 16 wherein said ridges have straight sides diverging outwardly at a ridge angle for urging said leading edge of said gate member into the center of the valve surface when said gate member is in said nearly closed position in a gate valve further including a groove extending along the valve surface and having straight sides diverging outwardly from the bottom surface of the groove at said ridge angle to the flow path.

18. The gate member recited in claim 16 wherein said gate member further comprises a generally flat disc gate member bounded by said leading edge and fully encapsulated with an integral covering of resilient material comprising said cap and said seals.

19. The gate member recited in claim 18 wherein said resilient material is Buna-N rubber with a hardness of 55-65 on the Durometer scale.

20. A gate valve comprising:
  a valve body forming a valve chamber having a flow path therethrough, an opening providing access to the interior of the valve chamber and a ledge on at least a part of the periphery of the opening outside the valve chamber, and a gate member mounted to said valve body for translation through said opening normal to the flow path into said valve chamber to a closed position preventing flow through said valve chamber and including:

a lip for overlapping the ledge when said gate member is in the closed position to form a sealing space between said lip and said ledge; and a seal of resilient material on said lip for compression in said sealing space to substantially prevent flow therethrough when said gate member is closed, said seal having, at a region thereof that is closer to the flow path, a bead portion thicker when uncompressed than the width of said sealing space for contacting the ledge when said gate member reaches a nearly closed position and, at a region thereof that is more remote from the flow path, a clearance portion for providing a gap between said seal and the ledge when said gate member is in said nearly closed position so to control said seal as it is compressed by the further closing gate member that the material displaced from said bead portion yields into said gap, ensuring that said seal fills said sealing space, and to reduce the amount of resilient material requiring compression to effectively seal said sealing space.

21. The gate valve recited in claim 20, wherein:

said valve chamber has substantially circularly cylindrical entrance portions;

said opening is disposed between said entrance portions along the direction of the flow path;

the periphery of said opening has two ledge portions opposing each other along the direction of the flow path;

said ledge portions extend the length of said opening and have ledge surfaces diverging outwardly from the periphery of said opening;

each said ledge portion is symmetrical in a plane normal to the flow path and includes a middle ledge portion comprising an extension of said entrance portion and having a predetermined radius of curvature and straight ledge portions extending outwardly from said middle ledge portion taught thereto at a ledge angle;

said lip includes two lip surfaces at a first angle to the flow path for overlapping the ledge surfaces to form sealing space with a uniform width at any given location for accurate control of the compression of said seal; and both said lip surfaces have said seal thereon.

22. The gate valve recited in claim 21 wherein said seal has a uniform cross-section along the length thereof and said seal on each said lip surface is symmetrical in a plane normal to the flow path and includes a substantially circularly arcuate middle seal portion having a radius of curvature smaller than said predetermined radius of curvature of said middle ledge portion and straight seal portions extending outwardly from said middle seal portions and tangent thereto at said ledge angle for urging said gate member into the middle of the opening in a plane normal to the flow path in said nearly closed position and providing substantially uniform compression of said seal for the length thereof.

23. The gate valve recited in claim 20, wherein said bead portion is arcuate in cross-section for contacting the ledge surfaces proximate to the periphery of the opening and said clearance portion is straight in cross-section and tangent to said bead portion extending therefrom at a second angle to the flow path greater than the first angle for urging said gate member into the middle of the opening in the direction of the flow path in said nearly closed position.

24. The gate recited in claim 21 wherein:

said valve chamber includes a valve surface opposite said opening:

said valve surface is symmetrical in a plane normal to the flow path and includes a middle valve surface portion comprising an extension of said entrance portions and two straight valve surface portions extending outwardly from said middle valve surface portion tangent thereto at a valve angle;

said opening terminates at said straight valve surface portions and said valve surface extends from one end to the other end of said opening;

said gate member includes generally a flat disc member bounded by a leading edge for facing the length of said valve surface when said gate member is closed and a cap of resilient material on said leading edge for compression between said gate member and said valve surface when said gate member is closed;

said leading edge has a raised spine thereon extending the length thereof; and said cap has a uniform cross-section along the length thereof, includes a recess and two ridges flanking said recess, said recessing being at substantially the same location as said raised spine, and is symmetrical in a plane normal to the flow path and includes a substantially circularly arcuate middle cap portion having a radius of curvature larger than said radius of curvature of said entrance portions and straight cap portions extending outwardly from said middle cap portion tangent thereto at said valve angle.

25. The gate valve recited in claim 24 wherein:

said opening has inside corners where said straight ledge portions meet said straight valve surfaces; and said seal includes an integral pad of said resilient material having an enlarged cross-section with a flat surface at said first angle to the flow path at the end of each said straight seal portion.

26. The gate member recited in claim 25 wherein said ledge angle is 55° and said valve angle is 50° to a plane normal to the direction of travel of said gate member, said first angle is 45° and said second angle is 60°.

27. The gate valve recited in claim 26 wherein said flat disc member is fully encapsulated with an integral covering of resilient material comprising said seals and said cap.

28. The gate valve recited in claim 26 or 27 wherein said resilient material in Buna-N rubber with a hardness of 55–65 on the Durometer scale.

29. The gate valve recited in claim 24, 25 or 27 wherein:

said valve surface includes a groove extending the length thereof and having straight sides diverging outwardly from the bottom surface of the groove at a ridge angle to the flow path; and said ridges have straight sides diverging outwardly at said ridge angle for urging said leading edge of said gate member into the center of the valve surface when said gate member is in said nearly closed position.

30. The gate valve recited in claim 29 wherein said ridge angle is 45°.

31. The gate valve recited in claim 29 wherein said ledge angle is 60° and said valve angle is 50° to a plane normal to the direction of travel of said gate member, said first angle and said ridge angle are 45° and said second angle is 60°.

32. The gate valve recited in claim 31 wherein said flat disc member is fully encapsulated with an integral covering of resilient Buna-N rubber with a hardness of 55-65 of the Durometer scale comprising said seals and said cap.

* * * * *